(12) United States Patent
Rang

(10) Patent No.: US 12,229,559 B2
(45) Date of Patent: Feb. 18, 2025

(54) FACILITATING PER-CPU REFERENCE COUNTING FOR MULTI-CORE SYSTEMS WITH A LONG-LIVED REFERENCE

(71) Applicant: EMC IP Holding Company LLC, Hopkinton, MA (US)

(72) Inventor: Anton Rang, Houlton, WI (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 238 days.

(21) Appl. No.: 17/504,904

(22) Filed: Oct. 19, 2021

(65) Prior Publication Data

US 2023/0121841 A1   Apr. 20, 2023

(51) Int. Cl.
| | |
|---|---|
| *G06F 9/32* | (2018.01) |
| *G06F 9/38* | (2018.01) |
| *G06F 9/4401* | (2018.01) |
| *G06F 9/46* | (2006.01) |
| *G06F 9/50* | (2006.01) |
| *G06F 9/52* | (2006.01) |

(52) U.S. Cl.
CPC ............ *G06F 9/321* (2013.01); *G06F 9/3836* (2013.01); *G06F 9/4405* (2013.01); *G06F 9/465* (2013.01); *G06F 9/5022* (2013.01); *G06F 9/526* (2013.01)

(58) Field of Classification Search
CPC ...... G06F 9/321; G06F 9/3836; G06F 9/4405; G06F 9/465; G06F 9/5022; G06F 9/526; G06F 9/45558; G06F 2009/45583; G06F 9/485; G06F 9/5077; G06F 2009/45575; G06F 9/45533; G06F 9/5016; G06F 2009/4557; G06F 9/449; G06F 9/5066; G06F 12/0261; G06F 12/0269; G06F 9/52; G06F 12/0276; G06F 9/50; G06F 11/3466; G06F 12/0253; G06F 12/023; G06F 12/1483; G06F 16/2343; G06F 2201/88; Y10S 707/99938; Y10S 707/99939
USPC ........................................................ 707/814
See application file for complete search history.

(56) References Cited

U.S. PATENT DOCUMENTS

| | | | | |
|---|---|---|---|---|
| 6,119,115 A | * | 9/2000 | Barr | G06F 9/526 |
| | | | | 718/107 |
| 6,473,806 B1 | * | 10/2002 | Snyder | G06F 9/465 |
| | | | | 719/310 |

(Continued)

*Primary Examiner* — Evan Aspinwall
(74) *Attorney, Agent, or Firm* — Amin, Turocy & Watson, LLP

(57) ABSTRACT

Facilitating per-CPU reference counting for multi-core systems with a long-lived reference is provided herein. A system includes a processor and a memory that stores executable instructions that, when executed by the processor, facilitate performance of operations. The operations include determining a first quantity of releases associated with an object in a data structure of the system and determining a second quantity of acquisitions associated with the object. The first quantity of releases can be distributed among respective first counters of processing elements of a group of processing elements. The second quantity of acquisitions can be distributed among respective second counters of the processing elements of the group of processing elements. Further, the operations can include, based on the second quantity of acquisitions and the first quantity of releases being determined to be a same value, implementing a removal of the object from the data structure.

20 Claims, 9 Drawing Sheets

(56) References Cited

U.S. PATENT DOCUMENTS

| Patent/Publication No. | Date | Inventor | Classification |
|---|---|---|---|
| 8,738,860 B1* | 5/2014 | Griffin | G06F 12/0897 711/122 |
| 10,872,073 B1* | 12/2020 | Gupta | G06F 16/2336 |
| 2007/0203960 A1* | 8/2007 | Guo | G06F 12/0269 |
| 2010/0268912 A1* | 10/2010 | Conte | G06F 11/3409 712/20 |
| 2010/0269102 A1* | 10/2010 | Latorre | G06F 9/3851 717/130 |
| 2010/0274972 A1* | 10/2010 | Babayan | G06F 9/3861 711/125 |
| 2011/0219381 A1* | 9/2011 | Ahn | G06F 12/0842 718/104 |
| 2012/0167106 A1* | 6/2012 | Shpeisman | G06F 9/52 718/102 |
| 2012/0246204 A1* | 9/2012 | Nalla | G06F 12/0253 707/E17.007 |
| 2014/0229956 A1* | 8/2014 | Fornaeus | G06F 9/5083 718/104 |
| 2014/0310438 A1* | 10/2014 | Richardson | G06F 9/526 710/200 |
| 2014/0317352 A1* | 10/2014 | Kleen | G06F 12/1466 711/170 |
| 2014/0372810 A1* | 12/2014 | Na | G06F 11/3433 714/47.1 |
| 2015/0186266 A1* | 7/2015 | Schreter | G06F 16/27 707/814 |
| 2015/0286586 A1* | 10/2015 | Yadav | G06F 9/526 711/152 |
| 2015/0378731 A1* | 12/2015 | Lai | G06F 9/3824 712/30 |
| 2016/0335125 A1* | 11/2016 | Lee | G06F 9/5038 |
| 2017/0060769 A1* | 3/2017 | Wires | G06F 12/1018 |
| 2017/0083435 A1* | 3/2017 | Walker | G06F 9/5016 |
| 2018/0349424 A1* | 12/2018 | Gurajada | G06F 3/0604 |
| 2019/0220418 A1* | 7/2019 | Chen | G06F 12/126 |
| 2020/0327051 A1* | 10/2020 | Nilsen | G06F 9/4488 |
| 2020/0409839 A1* | 12/2020 | Stephens | G06F 12/0269 |
| 2021/0263782 A1* | 8/2021 | Therien | G06F 9/5044 |
| 2022/0206714 A1* | 6/2022 | Choi | G06F 3/061 |

* cited by examiner

FACILITATING PER-CPU REFERENCE COUNTING FOR MULTI-CORE SYSTEMS WITH A LONG-LIVED REFERENCE

BACKGROUND

Reference counting is used to manage the lifetime of objects in a computer system. On computer systems with multiple processors, reference counting can be implemented using "atomic" operations to maintain a consistent count in the presence of multiple threads which may concurrently be attempting to update the count. On systems where a large number of processing elements are present, and where atomic operations are implemented in the processing elements rather than the memory, reference counting an object whose count frequently changes becomes expensive, potentially consuming a large amount of CPU as operations are serialized and the storage for the reference count is moved between processing element cache.

The above-described context with respect to conventional computing systems is merely intended to provide an overview of current technology and is not intended to be exhaustive. Other contextual description, and corresponding benefits of some of the various non-limiting embodiments described herein, will become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, provided herein is a system that includes a processor and a memory that stores executable instructions that, when executed by the processor, facilitate performance of operations. The operations can include determining a first quantity of releases associated with an object in a data structure of the system. The first quantity of releases can be distributed among respective first counters of processing elements of a group of processing elements. The operations also can include determining a second quantity of acquisitions associated with the object. The second quantity of acquisitions can be distributed among respective second counters of the processing elements of the group of processing elements. Further, the operations can include, based on the second quantity of acquisitions and the first quantity of releases being determined to be a same value, implementing a removal of the object from the data structure.

Determining the first quantity of releases can include summing the respective first values of the respective first counters. The respective first values are incremented based on acquisitions of the object being released at the respective processing elements. Determining the second quantity of acquisitions can include summing respective second values of the respective second counters. The respective second values are incremented based on acquisitions of the object being implemented at the respective processing elements.

According to an embodiment, implementing the removal of the object can include implementing the removal of a long-lived reference associated with the object. In some embodiments, implementing the removal can include, based on a determination that a removal of the object is being performed by a thread executing with respect to a processing element of the group of processing elements, releasing control of the removal of the object to the thread.

Based on the second quantity of acquisitions and the first quantity of releases being determined to be different values, the operations can include, according to some implementations, scheduling, at a defined time interval, another execution of determining the first quantity of releases, determining the second quantity of acquisitions, and implementing the removal.

In some implementations, the operations can include prohibiting performance of determining the second quantity of acquisitions until after completion of determining the first quantity of releases.

Implementing the removal of the object can include recovering storage space of the data structure. The first quantity of releases and the second quantity of acquisitions can be distributed unequally among respective first counters of processing elements of the group of processing elements. Further, the system can be a multiple processing core system.

Another embodiment relates to a method that can include comparing, by a system including a processor, first information indicative of first values of respective first counters of processing cores of a group of processing cores and second information indicative of second values of respective second counters of the processing cores of the group of processing cores. The first values and the second values are associated with an object of a multi-processing core system. The method also can include, based on a result of the comparing indicating that the first information indicative of the first values and the second information indicative of the second values are equal values, facilitating, by the system, a removal of the object from the multi-processing core system.

The first information indicative of first values includes a number of releases of the objects implemented at the processing elements. The second information indicative of second values includes a number of references to the objects implemented at the processing elements.

A first counter of the respective first counters is associated with a first processing core of the group of processing cores and a first release of the object at the first processing core increments the first counter by a first value of one. Further, a second release of the object at the first processing core increments the first counter by a second value of one.

A second counter of the respective second counters is associated with a first processing core of the group of processing cores and a first reference to the object at the first processing core increments the second counter by a first value of one. Further, a second reference to the object at the first processing core increments the second counter by a second value of one.

Prior to the comparing, the method can include, in some implementations, totaling, by the system, respective values of the respective first counters. Further to these implementations, the method can include totaling, by the system, respective values of the respective second counters. Further to these implementations, the method can include prohibiting, by the system, performance of the totaling of the respective values of the respective second counters until after completion of the totaling of the respective values of the respective first counters.

Based on the result of the comparing indicating that the first values and the second values are different values, the method can include scheduling, by the system, another execution of the comparing after a defined interval.

Another embodiment relates to a non-transitory machine-readable medium, including executable instructions that, when executed by a processor, facilitate performance of operations. The operations can include receiving first values of first counters of processing cores and second values of second counters of the processing cores. The first values indicate a first total value of respective releases of a defined object at respective processing cores of the processing cores. The second values indicate a second total value of respective acquisitions of the defined object at the respective processing cores. The operations also can include, based on a comparison of the first values and the second values indicating that the first values and the second values are a same value, removing the defined object from a multi-core system that includes the processing cores.

In some implementations, the operations can include, prior to the receiving the second values, determining that receiving the first values has finalized. According to some implementations, removing the defined object includes removing a long-lived reference associated with the defined object.

To the accomplishment of the foregoing and related ends, the disclosed subject matter includes one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

Figure 1:
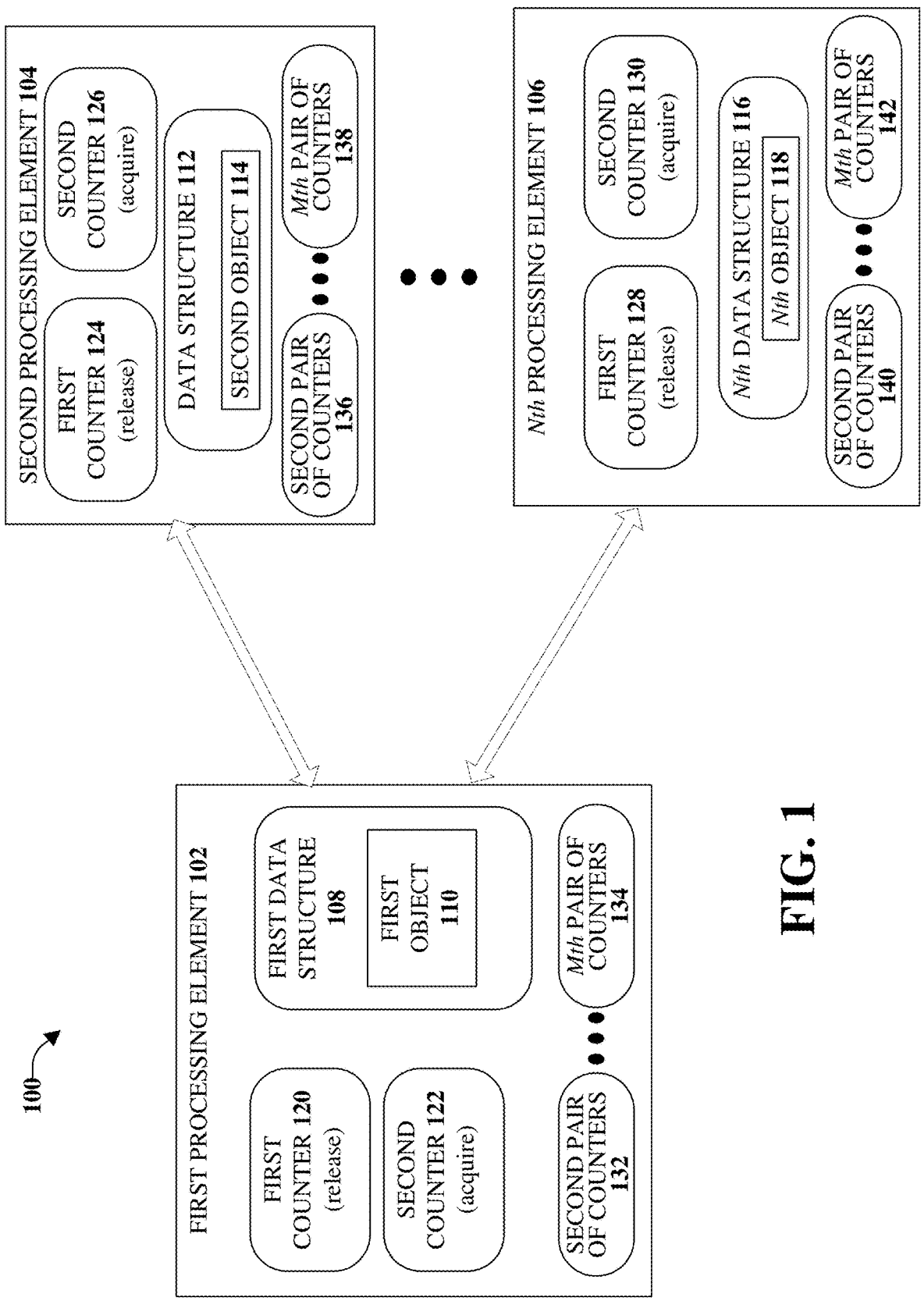
FIG. 1 illustrates an example, non-limiting, schematic representation of a system that includes multiple processing elements in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

The subject disclosure relates generally to per-CPU reference counting for multi-core systems with a long-lived reference. As mentioned, reference counting is a technique for managing the lifetime of objects in a computer system. On computer systems with multiple processors, reference counting can be implemented using "atomic" operations to maintain a consistent count in the presence of multiple threads which may concurrently be attempting to update the count. On systems where a large number of processing elements are present, and where atomic operations are implemented in the processing elements rather than the memory, reference counting an object whose count frequently changes becomes expensive, potentially consuming a large amount of CPU as operations are serialized and the storage for the reference count is moved between processing element caches.

Described herein is a technique that can be used in a common case, where an object has both a "long-lived" reference related to its presence in the system as a component of some larger structure, and "transient" references related to its use by active operations. As discussed herein, the cost of updating a transient reference count can be greatly reduced by using per-CPU counters if the long-lived reference is present.

A per-CPU counter is a collection of integers in memory which can be simultaneously updated by multiple processing elements (e.g., CPUs, cores, threads). There is one integer for each processing element which may update the per-CPU counter. The collection of integers is distributed in memory in such a way that each processing element can update its own integer without interference from any other processing element (e.g., in separate cache lines). The value of the counter at any point in time is defined to be the sum of all these integers.

While multiple processing elements can simultaneously (or substantially simultaneously) update the counter, the total cannot be consistently computed by any processing element, since any other element can update it at any time. If a consistent total is needed, some type of serialization is introduced, which eliminates the usefulness of the counter. For this reason, these counters have been used for statistics, where a "sloppy" value can be tolerated.

In multi-processing systems, the order in which updates to memory from one processing element become "visible" to other processing elements can be important. There can be some type of ordering for changes written to memory, while memory can be read in arbitrary order.

A "store fence" ensures that a change to memory made by a processing element is visible to other processing elements before other stores from that processing element. A "load fence" ensures that a read from memory requested by a processing element completes before a subsequent read (e.g., it orders read operations which would normally be allowed to complete in any order). Load and store fences can be defined as part of a CPU architecture.

FIG. 1 illustrates an example, non-limiting, schematic representation of a system 100 that includes multiple processing elements in accordance with one or more embodiments described herein. As illustrated, the system 100 can include multiple processing elements, illustrated as a first processing element 102, a second processing element 104, through an Nth processing element 106, where N is an integer.

The first processing element 102 includes a first data structure 108 that can include one or more data objects (illustrated as a first object 110). The second processing element 104 and the Nth processing element 106 include respective data structures and objects. For example, the second processing element 104 includes a second data structure 112 and a second data object 114 and the Nth processing element 106 includes an Nth data structure 116 and Nth data object 118. A single data object and data structure are shown and described with respect to the processing elements for purposes of simplicity, although more than one data object and/or more than one data structure can be included in the processing elements.

The processing elements can reference the data structures and/or object(s) stored in other processing elements. For example, the first processing element 102 can reference the second data structure 112 and/or the Nth data structure 116 and/or objects contained therein. In another example, the second can reference the first data structure 108 and/or the Nth data structure 116 and/or objects contained therein. In a similar manner, the Nth processing element 106 can reference the first data structure 108 and/or the second data structure 112.

Further, the processing elements can include two counters for each data structure and/or object stored on its own processing element and other processing elements. A first counter can track the number of times (e.g., increment each time) the data store and/or the object is released. A second counter can track the number of times (e.g., increment each time) the data store and/or the object is referenced or acquired (e.g., a read request, a write request). The first counter and second counter can be included in a first counter pair. Thus, the first processing element 102 includes a first counter 120 and a second counter 122; the second processing element 104 includes a first counter 124 and a second counter 126; and the Nth processing element 106 includes a first counter 128 and a second counter 130.

Further, the processing elements include additional counter pairs (e.g., an acquire counter and a release counter) for each data structure and/or object stored on itself and other processing elements. Therefore, the first processing element 102 includes a second counter pair 132 through an Mth counter pair 134; the second processing element 104 includes a second counter pair 136 through an Mth counter pair 138; and the Nth processing element 106 includes a second counter pair 140 through an Mth counter pair 142, where M is an integer. Since the first counter and the second counter are private counters (e.g., are retained in the cache of the CPU or processing elements) of the respective processing element, there is no locking needed in order to update the counter. Locking would be required if the counters were shared across the processing elements.

By way of example and not limitation, when the second processing element 104 references or acquires the first object 110 (or the first data structure 108), the second counter 126 is incremented by one. Thereafter, when the second processing element 104 is finished and releases the first data structure 108, the first counter 124 is incremented by one. Thereafter, if the second processing element 104 again references or acquires the first object 110 (or the first data structure 108), the second counter 126 is incremented again by one. The first counter 120 and the second counter 122 of the first processing element 102 are incremented in a similar manner when the first processing element 102 releases and/or acquires the first object 110 (or the first data structure 108). Additionally, the first counter 128 and the second counter 130 are incremented in a similar manner when the Nth processing element 106 releases and/or acquires the first object 110 (or the first data structure 108).

In further detail, let A be a data structure (e.g., the first data structure 108) which must remain in memory until its reference by data structure B (e.g., the second data structure 112, or the Nth data structure 116) has been removed, and all operations acting upon data structure A have completed. Within data structure A, three fields are used for reference counting, and one field is used for reclaim. The three fields for reference counting are: a Long Lived Reference (LL_REF field), a REFERENCES field, and a RELEASES field.

The LL_REF field indicates the state of the reference to data structure A from data structure B, with three possible values: NONE, REFERENCED, and RELEASED. The value NONE for the LL_REF field indicates that no processing element has a pointer to data structure A that can be discovered. The value REFERENCED for the LL_REF field indicates that one or more processing elements has data structure A in a list (e.g., a data structure) or another place such that running (or executing) processes could find data structure A. The value RELEASED for the LL_REF field indicates that the reference has been removed from the list (e.g., the data structure) or another place and, therefore, data structure A can no longer be discovered by processing elements.

The REFERENCES field is a per-CPU counter (e.g., the second counter 122, the second counter 126, the second counter 130) that is utilized to track acquired transient references to data structure A. The RELEASES field is a per-CPU counter (e.g., the first counter 120, the first counter 124, the first counter 128) that is utilized to track released transient references to A.

As discussed herein, two per-CPU counters are utilized because, when an operation is being executed, the processing element (e.g., CPU core) on which the reference is acquired might not be the same processing element (e.g., CPU core) which finishes the operation. For example, an operating system scheduler may move the location of execution of the thread from one CPU core to a different CPU core.

The one field with data structure A used for reclaim is a RECLAIMING field, which is a Boolean variable that is updated atomically. Thus, there is a flag that is set to indicate that an attempt is being made to delete data structure A. Thus, the LL_REF is going away and data structure A needs to be removed when the last operation has executed and completed.

Further, there are five procedures to facilitate the per-CPU reference counting for multi-core systems with a long-lived reference as discussed herein. Initialize (INIT) is used to initialize the state of data structure A when it is first created. In pseudocode:

```
set A.LL_REF to NONE
set A.REFERENCES to all 0
set A.RELEASES to all 0
set A.RECLAIMING to false
```

A first procedure is used to acquire the long-lived reference (ACQUIRE_LL_REF). This procedure is used to record the long-lived reference from B to A. In pseudo-code:
set A.LL_REF to REFERENCED A second procedure is a release of the long-lived reference (RELEASE_LL_REF) This procedure is used to release the long-lived reference from data structure B to data structure A. In pseudo-code, where the value of A RELEASES means the sum of the counter's value at each processing element:

```
set A.LL_REF to RELEASED
set releases to the value of A.RELEASES
load fence
set references to the value of A.REFERENCES
if (atomic_compare_and_set(A.RECLAIMING, false, true)) succeeds:
   if (releases = references):
      destroy A
   else
      schedule RECLAIM to run at a future time
```

A third procedure is an acquire transient reference (ACQUIRE_TRANSIENT_REF). This procedure is used to record a transient reference. In pseudo-code:

```
            increment A.REFERENCES
            store fence
```

A fourth procedure is a release transient reference (RELEASE_TRANSIENT_REF). This procedure is used to release a transient reference. In pseudo-code:

```
increment A.RELEASES
if A.LL_REF = NONE:
   set releases to the value of A.RELEASES
   load fence
   set references to the value of A.REFERENCES
   if (releases = references):
      if (atomic_compare_and_set(A.RECLAIMING, false, true))
      succeeds:
         destroy A
```

A fifth procedure is a reclaim procedure (RECLAIM). The RECLAIM procedure checks if the last transient reference to the object has been removed. After the last transient reference has been removed and there are no more references to the object, the object is destroyed. In pseudo-code:

```
      set releases to the value of A.RELEASES
      load fence
      set references to the value of A.REFERENCES
      if (releases = references):
         destroy A
      else
         schedule RECLAIM to run again at a future time
```

In a common case, the long-lived reference exists, and the transient acquire/release procedures simply adjust a per-CPU counter. There is no serialization required.

In some cases, the object may be referenced transiently before the long-lived reference has been added, when LL_REF is NONE, and the object may never gain its long-lived reference. In this case, transient releases will check if they are the last release, and destroy the object if they are the last release. The atomic operation on RECLAIMING ensures that only one processing element will actually destroy the object, even if two are releasing their references in parallel.

The per-CPU counters are always read such that the release counters are summed first, then the acquisitions, with a load fence between them. In conjunction with the store fence in the transient acquire procedure, this guarantees that the reference count will always be larger than the release count if there are any outstanding acquired references; it is impossible for a release to be seen before its acquisition.

At the end of an object's life, its long-lived reference will be removed. The transient operations on the object continue to be fast, as they need not sum the per-CPU counters. This is important in the case where these operations are being performed by processing elements, which may be executing tasks on many objects. The use of a delayed task to check for the reference count allows the thread releasing the long-lived object to continue to do other work without having to wait for all references to be removed. In addition, by not requiring transient releases to check whether the long-lived reference still exists, no synchronization is needed between transient operations and the long-lived reference.

Figure 2:
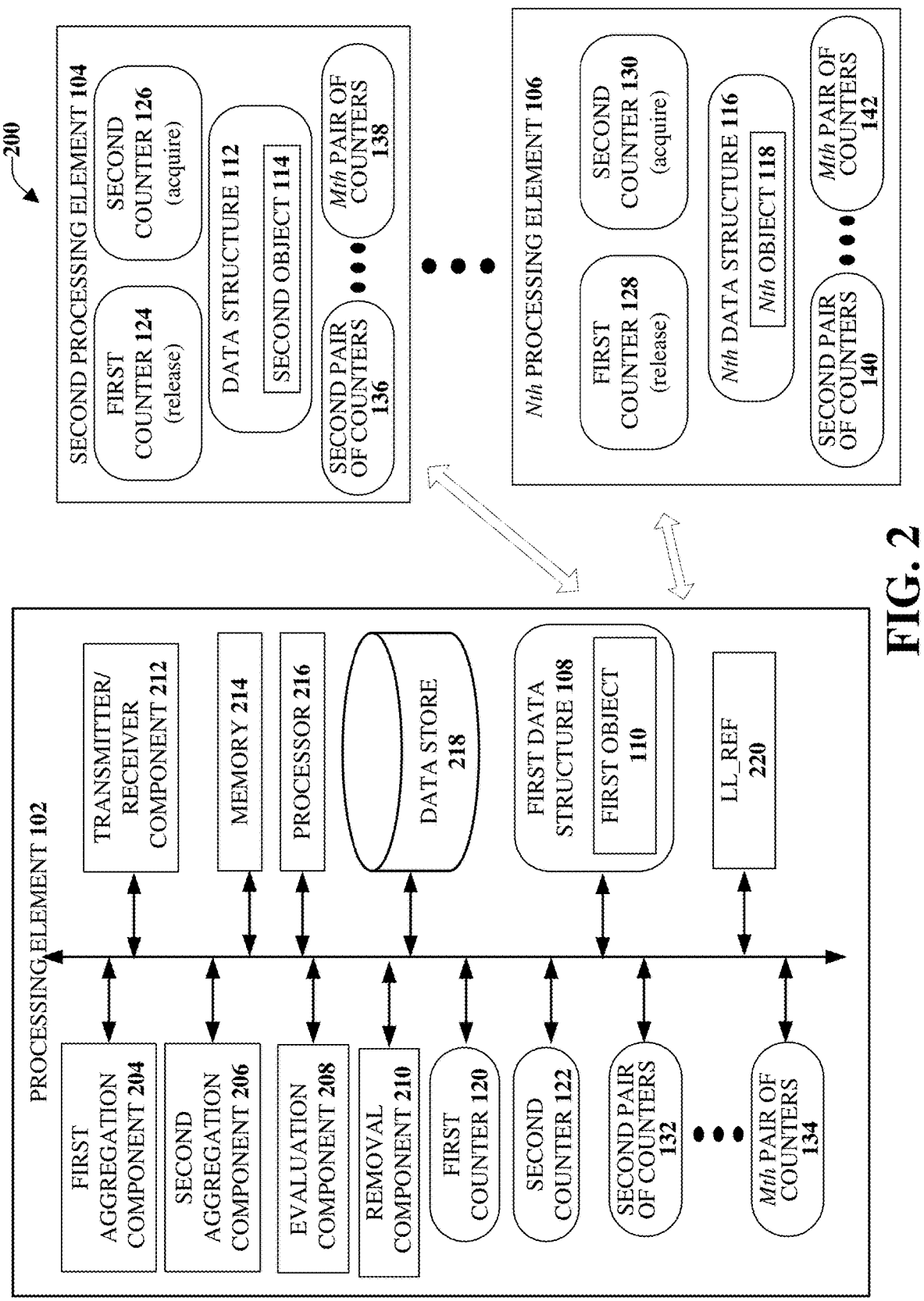
FIG. 2 illustrates an example, non-limiting, system that facilitates per-CPU reference counting in accordance with one or more embodiments described herein.

FIG. 2 illustrates an example, non-limiting, system 200 that facilitates per-CPU reference counting in accordance with one or more embodiments described herein. Repetitive description of like elements employed in other embodiments described herein is omitted for sake of brevity. The system 200 can be configured to perform functions associated with a computer-implemented method 400 of FIG. 4, a computer-implemented method 500 of FIG. 5, a computer-implemented method 600 of FIG. 6, a computer-implemented method 700 of FIG. 7, and/or other computer-implemented methods discussed herein.

Aspects of systems (e.g., the system 200 and the like), devices, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the systems (e.g., the system 200 and the like) can be any type of component, machine, device, facility, apparatus, and/or instrument that includes a processor and/or can be capable of effective and/or operative communication with a wired and/or wireless network. Components, machines, apparatuses, devices, facilities, and/or instrumentalities that can include the system 200 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like. In some implementations, the system 200 and/or other systems discussed herein can be a multiple processing core system.

The system 200 can include the processing element 102, which can be, or can be associated with, a computing system that includes multiple processing elements. The processing element 102 can include a first aggregation component 204, a second aggregation component 206, an evaluation component 208, a removal component 210, a transmitter/receiver component 212, at least one memory 214, at least one processor 216, and at least one data store 218.

The first aggregation component 204 can determine a first quantity of releases associated with an object in a data structure of the system. The first quantity of releases is distributed among respective first counters of processing elements of a group of processing elements. For example, the first aggregation component 204 can access or receive information related to respective quantities stored in the first counters (e.g., the first counter 120, the first counter 124, the first counter 128) of processing elements (e.g., the first processing element 102, the second processing element 104, the Nth processing element 106) within the system 200. The first aggregation component 204 can add together (sum) the respective quantities (e.g., the respective first values of the respective first counters) stored in the first counters to obtain a total number of releases associated with the data object.

The second aggregation component 206 can determine a second quantity of acquisitions (or references) associated with the object. The second quantity of acquisitions is distributed among respective second counters of processing elements of a group of processing elements. For example, the second aggregation component 206 can access or receive information related to respective quantities stored in the second counters (e.g., the second counter 122, the second counter 126, the second counter 130) of the processing elements (e.g., the first processing element 102, the second processing element 104, the Nth processing element 106) within the system 200. The second aggregation component 206 can add together (sum) the respective quantities (e.g., the respective second values of the respective second counters) stored in the second counters to obtain a total number of references (or acquires) associated with the data object.

The second aggregation component 206 can be restricted (or prohibited) from acting until the first aggregation component 204 has acquired and summed the releases. This restriction can be implemented via a load fence, for example.

Further, the evaluation component 208 can determine whether the first quantity of releases and the second quantity of acquisitions are the same value. If they are the same value, then all requests or references to the object have been released and, therefore, the object can be deleted. Thus, the removal component 210 can implement a removal of the object from the data structure. For example, the removal component 210 can delete the object. According to some implementations, to implement the removal, the removal component 210 can implement removal of a long-lived reference (LL_REF 220) associated with the object. Removal of the object can recover storage space of the data store.

It is noted that the first quantity of releases and the second quantity of acquisitions can be distributed equally or unequally among respective first counters of the processing elements. In some cases, a processing element might not have referenced nor released the object and, therefore, its counters would have a value of zero. In some cases, a processing element might have referenced and/or released the object one or more times. Further, the first counter and the second counter of a processing element might have different values (e.g., a first processing element referenced an object, and a second processing element executed one or more operations with respect to the object and released the object, or vice versa). Therefore, the total counts across the entire system are summed and analyzed as discussed herein.

The at least one memory 214 can be operatively connected to the at least one processor 216. The at least one memory 214 can store executable instructions and/or computer executable components (e.g., the first aggregation component 204, the second aggregation component 206, the evaluation component 208, the removal component 210, the transmitter/receiver component 212, and so on) that, when executed by the at least one processor 216 can facilitate performance of operations (e.g., the operations discussed with respect to the various methods and/or systems discussed herein). Further, the at least one processor 216 can be utilized to execute computer executable components (e.g., the first aggregation component 204, the second aggregation component 206, the evaluation component 208, the removal component 210, the transmitter/receiver component 212, and so on) stored in the at least one memory 214.

For example, the at least one memory 214 can store protocols associated with facilitating a per-CPU reference counting procedure for multi-core systems with a long-lived reference as discussed herein. Further, the at least one memory 214 can facilitate action to control communication between the system 200 and other node devices, one or more systems, one or more devices, such that the system 200 employs stored protocols and/or algorithms to achieve improved overall performance of computing systems as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to include, without being limited to, these and other suitable types of memory.

The at least one processor 216 can facilitate respective analysis of information related to implementing a per-CPU reference counting procedure for multi-core systems with a long-lived reference. The at least one processor 216 can be a processor dedicated to analyzing and/or generating information received, a processor that controls one or more components of the system 200, and/or a processor that both analyzes and generates information received and controls one or more components of the system 200.

The transmitter/receiver component 212, can facilitate determination of a total number of releases for a data store and a total number of references to the data store and further action can be taken based on whether the total numbers are equal or are not equal, as discussed herein. The transmitter/receiver component 212 can be configured to transmit to, and/or receive data from, for example, one or more counters associated with processing elements, a defined entity, one or more other nodes, and/or other communication devices. Through the transmitter/receiver component 212, the system 200 can concurrently transmit and receive data, can transmit and receive data at different times, or combinations thereof.

Figure 3:
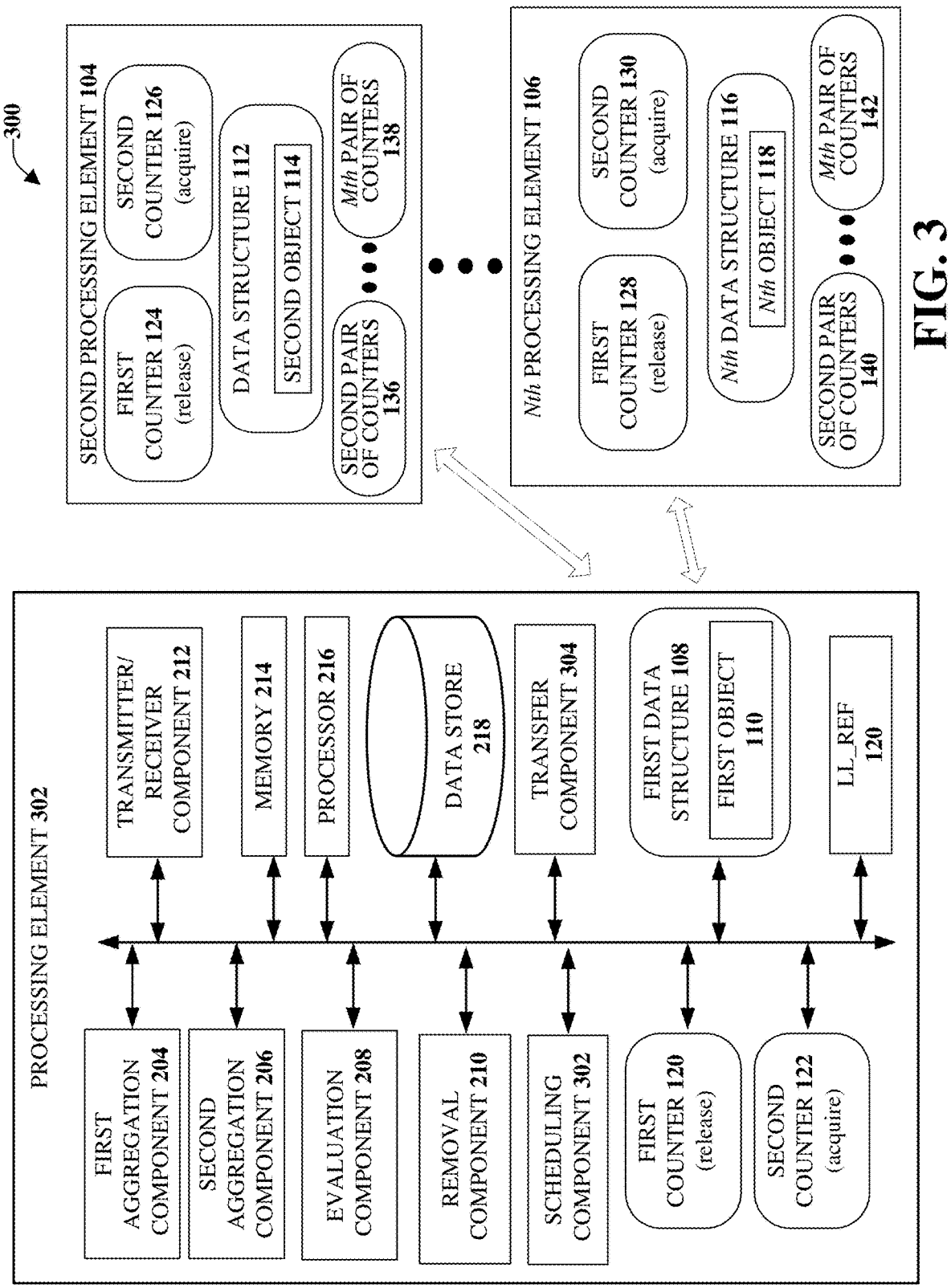
FIG. 3 illustrates an example, non-limiting, system that facilitates removal of an object based on per-CPU reference counting in accordance with one or more embodiments described herein.

FIG. 3 illustrates an example, non-limiting, system 300 that facilitates removal of an object based on per-CPU reference counting in accordance with one or more embodiments described herein. Repetitive description of like elements employed in other embodiments described herein is omitted for sake of brevity. The system 300 can be configured to perform functions associated with the computer-implemented method 400 of FIG. 4, the computer-implemented method 500 of FIG. 5, the computer-implemented method 600 of FIG. 6, the computer-implemented method 700 of FIG. 7, and/or other computer-implemented methods discussed herein.

As illustrated, the processing element 102 includes a scheduling component 302 and a transfer component 304. If the determination by the evaluation component 208 is that the first quantity of releases and the second quantity of acquisitions are not the same value, it indicates that there is still a processing element that is using (or referencing) the object. Therefore, the object cannot be deleted until all references have been released. In this situation, the scheduling component 302 can determine a defined time, after which the first aggregation component 204 acquires and determines a total number of releases associated with the object, the second aggregation component 206 acquires and determines a total number of references associated with the object, and the evaluation component 208 compares the two numbers to determine if the numbers are the same or different. If the numbers are the same, the removal component 210 can facilitate removal of the object. If the numbers are different, the scheduling component 302 can schedule another time for the process to repeat. This process can repeat any number of times until the two numbers match and the object can be removed. Further, the defined time for each retry attempt can be a same amount of time, or a different amount of time.

According to some implementations, when the two numbers are the same, there might be another processing element that is already in the process of removing the object. For example, the second processing element 104 or the Nth processing element 106 might have already started the process of removing the object and is waiting for the number of releases and the number of references to match. In this case, the transfer component 304 can release control of the removal of the object to the thread (e.g., the second processing element 104 or the Nth processing element 106) that has already initiated the removal process. Such determination to release control via the transfer component 304 can be based on performing the atomic operation on RECLAIMING, as discussed above.

Figure 4:
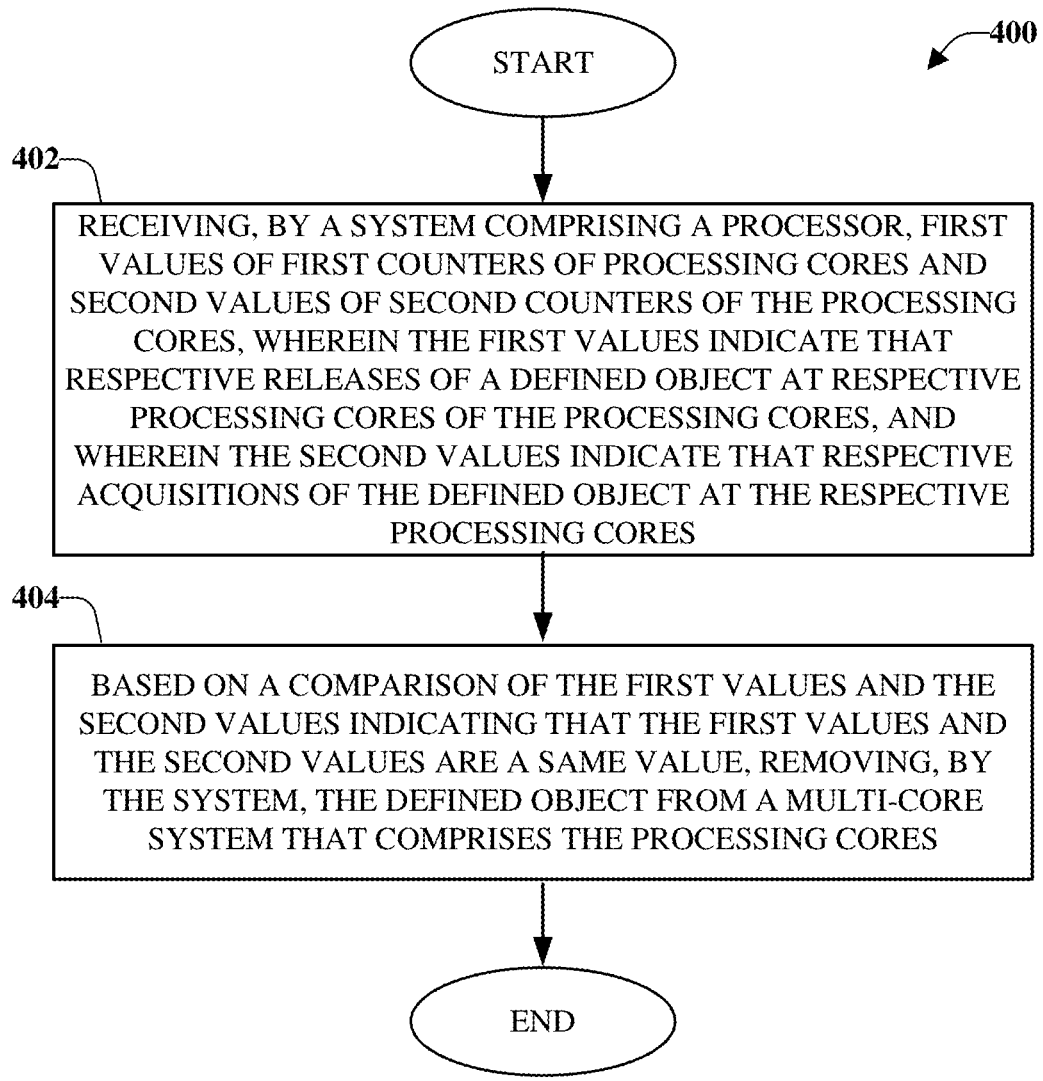
FIG. 4 illustrates a flow diagram of an example, non-limiting, computer-implemented method that facilitates removal of objects in a multi-core system in accordance with one or more embodiments described herein.

FIG. 4 illustrates a flow diagram of an example, non-limiting, computer-implemented method 400 that facilitates removal of objects in a multi-core system in accordance with one or more embodiments described herein. The computer-implemented method 400 and/or other methods discussed herein can be implemented by a system including a processor and a memory (e.g., the system 200 of FIG. 2, the system 300 of FIG. 3). In an example, the system can be implemented by one or more processing elements (or processing cores) of a group of processing elements (or processing cores).

The computer-implemented method 400 starts at 402 when first values of first counters of processing cores and second values of second counters of the processing cores are received (e.g., via the transmitter/receiver component 212). The first values indicate a total value of respective releases of a defined object at respective processing cores of the processing cores. The second values indicate a total value of respective acquisitions of the defined object at the respective processing cores. It is noted that summing of first values should be finalized before the second values are obtained. If the references are summed first, then another reference could be made before the releases are summed, which could result in deletion of an object that is in use.

For example, the per-CPU counters are always read such that the release counters are summed first, then the acquisitions, with a load fence between them. In conjunction with the store fence in the transient acquire procedure, this guarantees that the reference count will always be larger than the release count if there are any outstanding acquired references; it is impossible for a release to be seen before its acquisition.

Based on a comparison of the first values and the second values indicating that the first values and the second values are a same value, at 404, the defined object is removed from a multi-core system that includes the processing cores (e.g., via the removal component 210). Removing the defined object can include removing a long-lived reference associated with the defined object.

Figure 5:
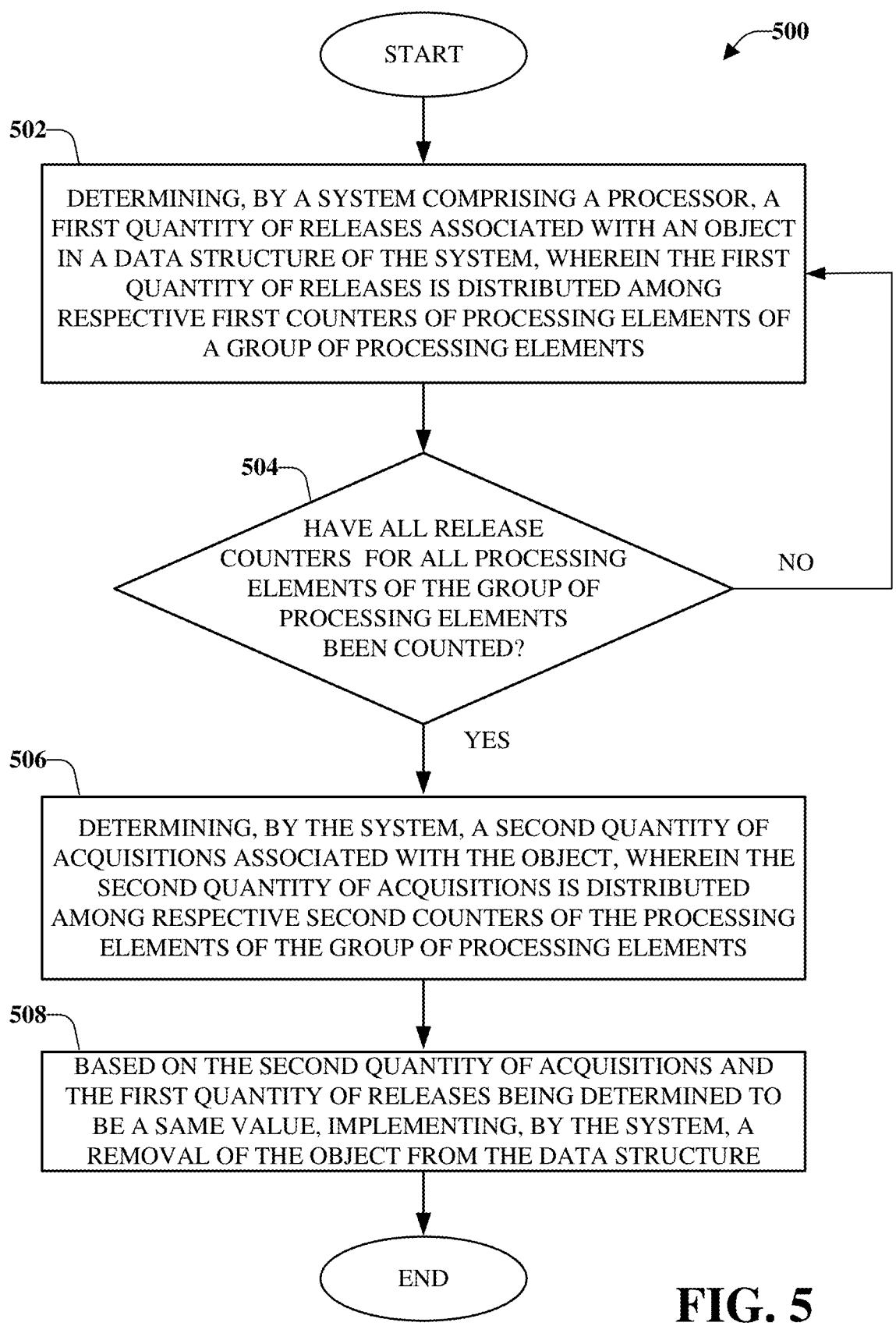
FIG. 5 illustrates a flow diagram of an example, non-limiting, computer-implemented method that facilitates removal of objects in multi-core systems in accordance with one or more embodiments described herein.

FIG. 5 illustrates a flow diagram of an example, non-limiting, computer-implemented method 500 that facilitates removal of objects in multi-core systems in accordance with one or more embodiments described herein. The computer-implemented method 500 and/or other methods discussed herein can be implemented by a system including a processor and a memory (e.g., the system 200 of FIG. 2, the system 300 of FIG. 3). In an example, the system can be implemented by one or more processing elements (or processing cores) of a group of processing elements (or processing cores).

The computer-implemented method 500 starts at 502 with determining, by a system including a processor, a first quantity of releases associated with an object in a data structure of the system (e.g., via the first aggregation component 204). The first quantity of releases is distributed among respective first counters of processing elements of a group of processing elements. The distribution of the first quantity of releases can be an equal distribution or an unequal distribution among the processing elements.

Determining the first quantity of releases can include summing the respective first values of the respective first counters. The respective first values can be incremented (at respective processing elements) based on acquisitions of the object being released at the respective processing elements.

At 504, a determination is made whether the first quantity of releases is finalized (e.g., via implementation of a load fence instruction by the at least one processor 216). For example, the determination can be whether all release counters for all processing elements of the group of processing elements have been counted. If not, the computer-implemented method 500 returns to 502 and further counting is performed.

If the determination at 504 is that all releases have been counted ("YES"), at 506, a second quantity of acquisitions associated with the object is determined (e.g., via the second aggregation component 206). The second quantity of acquisitions is distributed among respective second counters of the processing elements of the group of processing elements. The distribution of the second quantity of acquisitions can be an equal distribution or an unequal distribution among the processing elements.

Determining the second quantity of acquisitions can include summing respective second values of the respective second counters. The respective second values are incremented (at respective processing elements) based on acquisitions of the object being implemented at the respective processing elements Based on the second quantity of acquisitions and the first quantity of releases being determined to be a same value, at 508, a removal of the object from the data structure is implemented (e.g., via the removal component 210). Implementing the removal of the object can include implementing the removal of a long-lived reference associated with the object.

Figure 6:
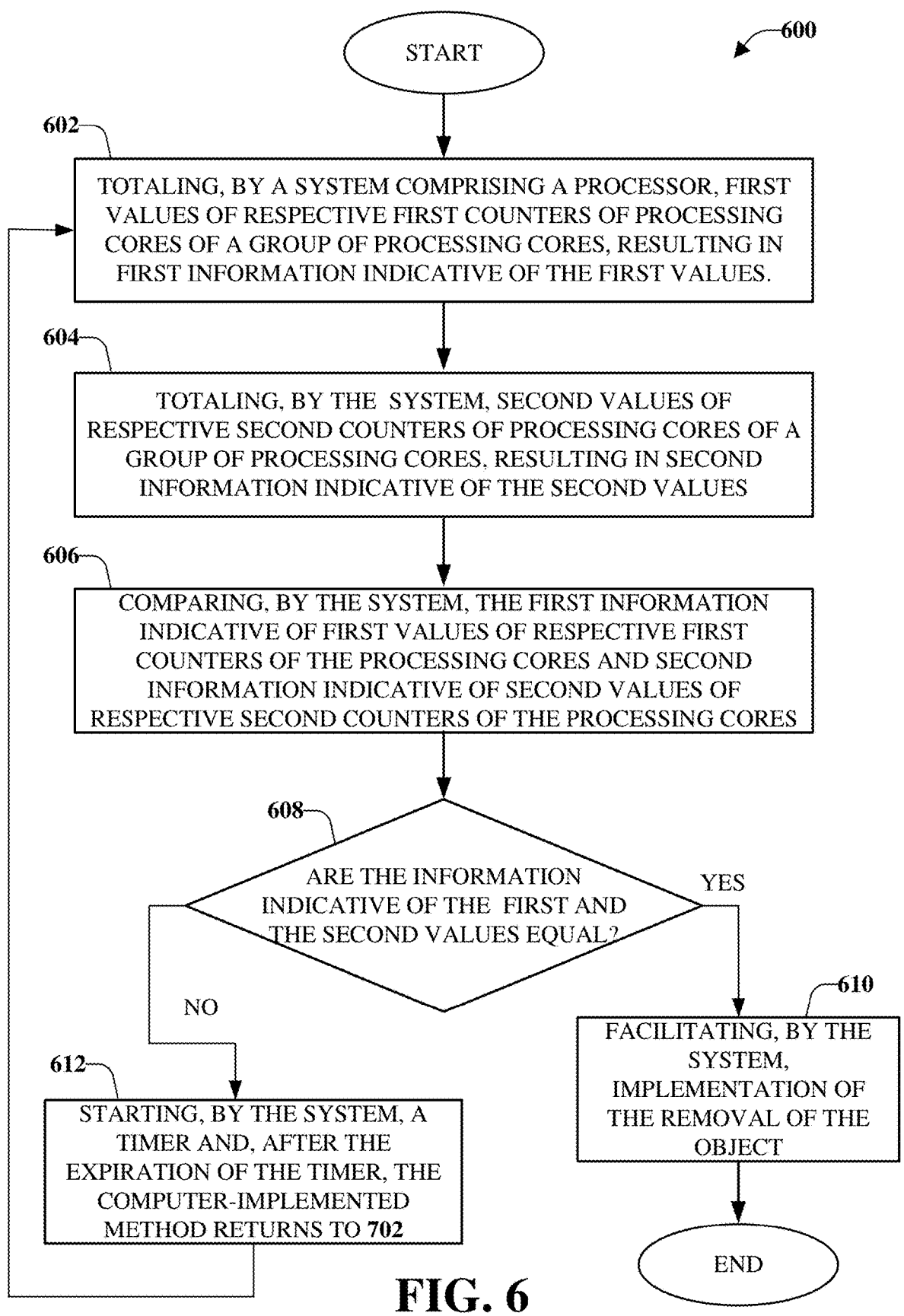
FIG. 6 illustrates a flow diagram of an example, non-limiting, computer-implemented method that facilitates a per-CPU reference counting procedure with a long-lived reference in accordance with one or more embodiments described herein.

FIG. 6 illustrates a flow diagram of an example, non-limiting, computer-implemented method 600 that facilitates a per-CPU reference counting procedure with a long-lived reference in accordance with one or more embodiments described herein. The computer-implemented method 600 and/or other methods discussed herein can be implemented by a system including a processor and a memory (e.g., the system 200 of FIG. 2, the system 300 of FIG. 3). In an example, the system can be implemented by one or more processing elements (or processing cores) of a group of processing elements (or processing cores).

The computer-implemented method 600 starts at 602, when a system including a processor totals (e.g., adds together) first values of respective first counters of processing cores of a group of processing cores, resulting in first information indicative of the first values (e.g., via the first aggregation component 204). The first values are associated with an object of a multi-processing core system. The first information indicative of the first values includes a number of releases of the objects implemented at the processing elements.

Upon or after completing the totaling of the first values, at 604, the system totals (e.g., adds together) second values of respective second counters of the processing cores of the group of processing cores, resulting in second information indicative of the second values (e.g., via the second aggregation component 206). The second values are associated with the object of the multi-processing core system. The second information indicative of the second values includes a number of references to the objects implemented at the processing elements.

The first information indicative of first values of respective first counters are compared, at 606, with the second information indicative of second values of respective second counters (e.g., via the evaluation component 208). At 608, a determination is made whether the first information indicative of the first values and the second information indicative of the second values are equal (e.g., via the evaluation component 208). If the information indicative of the values are equal ("YES"), at 610, the system facilitates a removal of the object at the multi-processing core system (e.g., via the removal component 210).

However, if the determination at 606 is that the information indicative of the first and second values are not equal or are different values ("NO"), at 612, the system starts a timer and, after the expiration of the timer, the computer-implemented method returns to 602. This process can be recursive such that the method continues via the feedback loop until the information indicative of the first and second values are equal. The length of the timer can be a defined interval and can be determined based on various design considerations. In some implementations, the length of the timer can be configurable.

Figure 7:
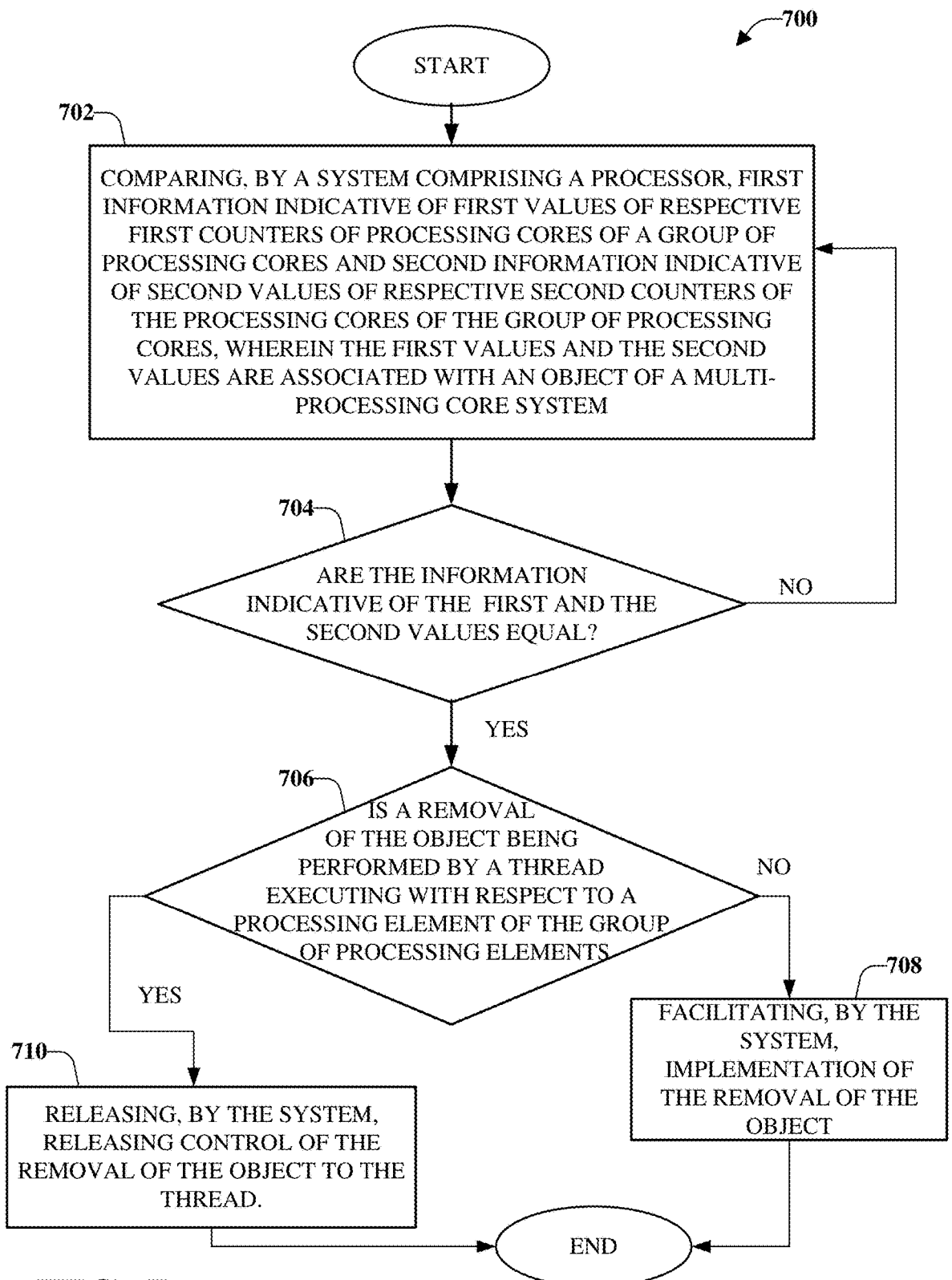
FIG. 7 illustrates a flow diagram of an example, non-limiting, computer-implemented method that facilitates removal of on object in a multi-core system by a single processing element in accordance with one or more embodiments described herein.

FIG. 7 illustrates a flow diagram of an example, non-limiting, computer-implemented method 700 that facilitates removal of on object in a multi-core system by a single processing element in accordance with one or more embodiments described herein. The computer-implemented method 700 and/or other methods discussed herein can be implemented by a system including a processor and a memory (e.g., the system 200 of FIG. 2, the system 300 of FIG. 3). In an example, the system can be implemented by one or more processing elements (or processing cores) of a group of processing elements (or processing cores).

At 702 of the computer-implemented method 700, a system including a processor compares first information indicative of first values of respective first counters of processing cores of a group of processing cores and second information indicative of second values of respective second counters of the processing cores of the group of processing cores (e.g., via the evaluation component 208. The first values and the second values are associated with an object of a multi-processing core system.

A determination is made, at 704, whether the first information indicative of the first values and the second information indicative of the second values are the same value (e.g., via the evaluation component). If not the same value ("NO"), the computer-implemented method 700 returns to 702. If the values are the same ("YES"), at 706 another determination is made whether a removal of the object is already being performed by a thread executing with respect to a processing element of the group of processing elements (e.g., via the at least one processor 216 or another system component).

If the determination at 706 is that another thread is not already being performed ("NO"), at 708, the system facilitates a removal of the object at the multi-processing core system (e.g., via the removal component). However, if it is determined at 706 that another thread has already initiated the removal, at 710, the system releases control of the removal of the object to the thread (e.g., via the transfer component 304). In such a manner, only one processing element is attempting to remove the object, which can avoid collisions.

Methods that can be implemented in accordance with the disclosed subject matter, will be better appreciated with reference to the flow charts provided herein. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

Figure 8:
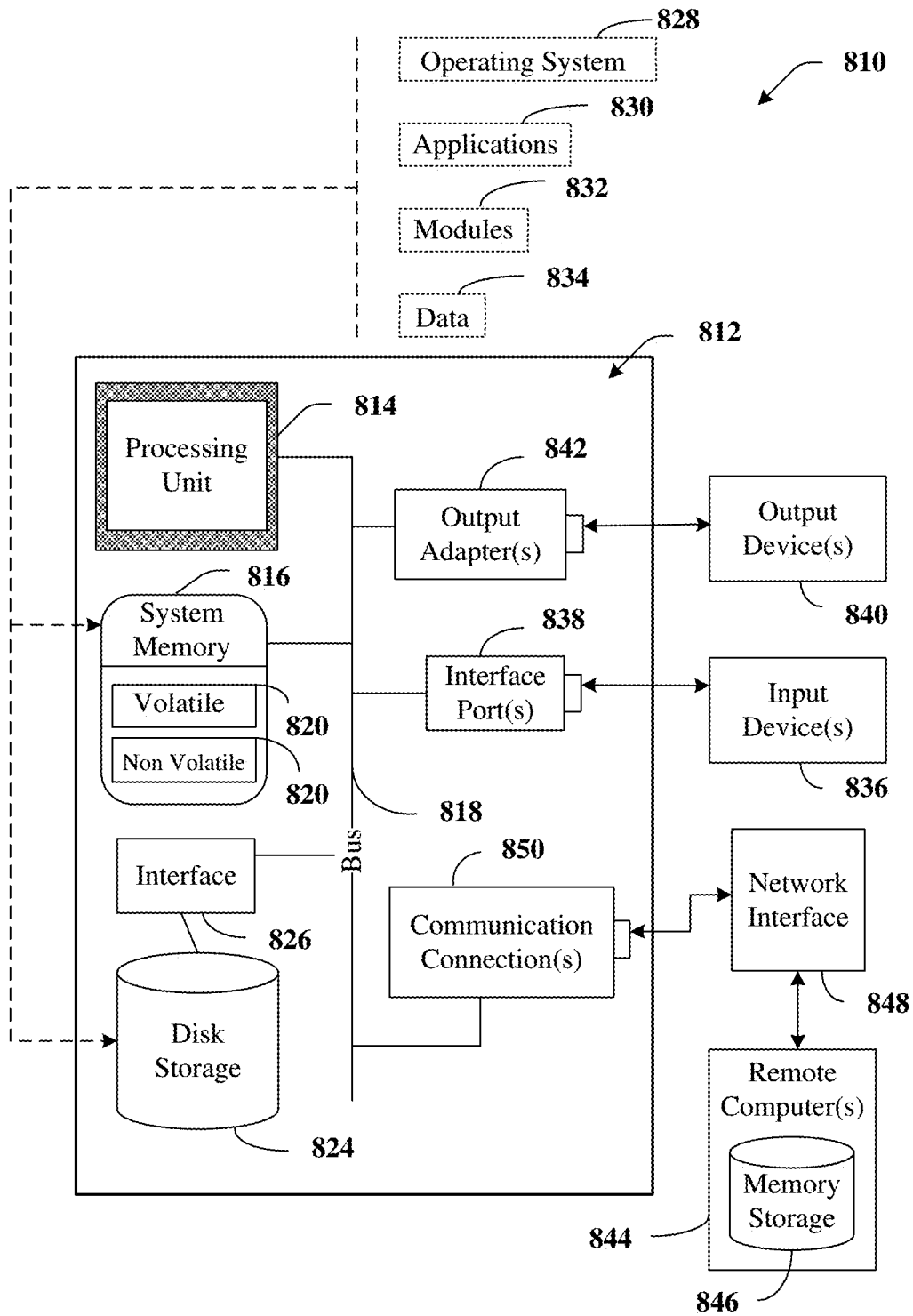
FIG. 8 illustrates an example, non-limiting, computing environment in which one or more embodiments described herein can be facilitated.

In order to provide a context for the various aspects of the disclosed subject matter, FIG. 8 as well as the following discussion are intended to provide a brief, general description of a suitable environment in which the various aspects of the disclosed subject matter can be implemented.

With reference to FIG. 8, an example environment 810 for implementing various aspects of the aforementioned subject matter includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Multi-core microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable PROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer 812. System applications 830 take advantage of the management of resources by operating system 828 through program modules 832 and program data 834 stored either in system memory 816 or on disk storage 824. It is to be appreciated that one or more embodiments of the subject disclosure can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapters 842 are provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5, and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the system bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
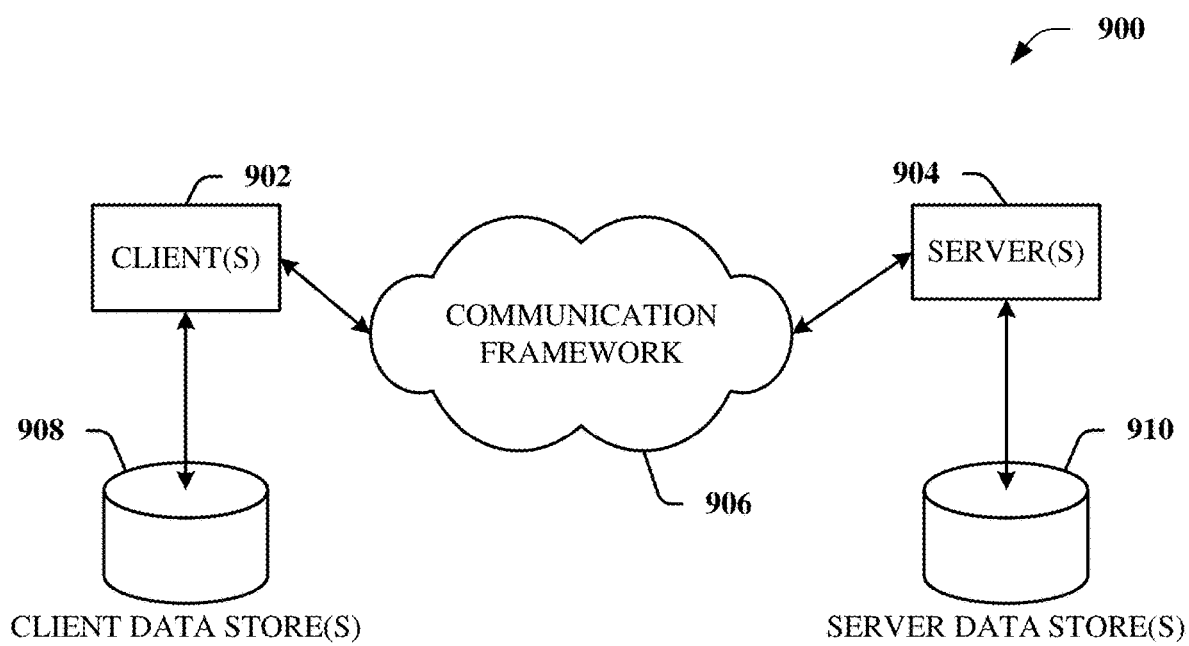
FIG. 9 illustrates an example, non-limiting, networking environment in which one or more embodiments described herein can be facilitated.

FIG. 9 is a schematic block diagram of a sample computing environment 900 with which the disclosed subject matter can interact. The sample computing environment 900 includes one or more client(s) 902. The client(s) 902 can be hardware and/or software (e.g., threads, processes, computing devices). The sample computing environment 900 also includes one or more server(s) 904. The server(s) 904 can also be hardware and/or software (e.g., threads, processes, computing devices). The servers 904 can house threads to perform transformations by employing one or more embodiments as described herein, for example. One possible communication between a client 902 and servers 904 can be in the form of a data packet adapted to be transmitted between two or more computer processes. The sample computing environment 900 includes a communication framework 906 that can be employed to facilitate communications between the client(s) 902 and the server(s) 904. The client(s) 902 are operably connected to one or more client data store(s) 908 that can be employed to store information local to the client(s) 902. Similarly, the server(s) 904 are operably connected to one or more server data store(s) 910 that can be employed to store information local to the servers 904.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. Yet another example, a component can be an apparatus that provides specific functionality through electronic components without mechanical parts, the electronic components can include a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can include, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A multiple processing core system, comprising:
a processor; and
a memory that stores executable instructions that, when executed by the processor, facilitate performance of operations, comprising:
determining a first quantity of releases associated with an object in a data structure of the multiple processing core system, wherein the first quantity of releases is distributed among respective first counters of first processing cores of a group of processing cores of the multiple processing core system;
determining a second quantity of acquisitions associated with the object, wherein the second quantity of acquisitions is distributed among respective second counters of second processing cores of the group of processing cores, wherein at least one first processing core of the first processing cores executed an operation with respect to the object and released the object and at least one second processing core of the second processing cores referenced the object; and
based on the second quantity of acquisitions and the first quantity of releases being determined to be a same value and based on a reclaim field in the data structure comprising an indication that the object is scheduled for removal, implementing the removal of the object from the data structure by a processing core selected from the group of processing cores based on the processing core being determined to be a last processing core to release the object.

2. The multiple processing core system of claim 1, wherein the determining the first quantity of releases comprises summing the respective first values of the respective first counters, and wherein the respective first values are incremented based on acquisitions of the object being released at the respective first processing cores.

3. The multiple processing core system of claim 1, wherein the determining the second quantity of acquisitions comprises summing respective second values of the respective second counters, and wherein the respective second values are incremented based on acquisitions of the object being implemented at the respective second processing cores.

4. The multiple processing core system of claim 1, wherein the implementing the removal of the object comprises the implementing the removal of a long-lived reference associated with the object.

5. The multiple processing core system of claim 1, wherein the implementing the removal comprises:
based on a determination that a removal of the object is being performed by a thread executing with respect to a first processing core of the group of processing cores, releasing control of the removal of the object to the thread.

6. The multiple processing core system of claim 1, wherein the operations further comprise:
based on the second quantity of acquisitions and the first quantity of releases being determined to be different values, scheduling, at a defined time interval, another execution of the determining the first quantity of releases, the determining the second quantity of acquisitions, and the implementing the removal.

7. The multiple processing core system of claim 1, wherein the operations further comprise:
prohibiting performance of the determining the second quantity of acquisitions until after completion of the determining the first quantity of releases.

8. The multiple processing core system of claim 1, wherein the implementing the removal of the object comprises recovering storage space of the data structure.

9. The multiple processing core system of claim 1, wherein the first quantity of releases and the second quantity of acquisitions are distributed unequally among respective first counters of processing cores of the group of processing cores.

10. A method, comprising:
comparing, by a multiple processing core system comprising a processor, first information indicative of first values of respective first counters of first processing cores of a group of processing cores of the multiple processing core system and second information indicative of second values of respective second counters of second processing cores of the group of processing cores, wherein the first values and the second values are associated with an object of a multi-processing core system, wherein at least one first processing core of the first processing cores executed an operation with respect to the object and released the object and at least one second processing core of the second processing cores referenced the object; and
based on a flag of a reclaim field of a data structure of the multiple processing core system being set, wherein the flag indicates the object is to be removed, and based on a result of the comparing indicating that the first information indicative of the first values and the second information indicative of the second values are equal values, facilitating, by the multiple processing core system, a removal of the object from the multiple processing core system by a processing core selected from the group of processing cores based on the processing core being determined to be a last processing core to release the object.

11. The method of claim 10, wherein the first information indicative of first values comprises a number of releases of the objects implemented at the processing cores, and wherein the second information indicative of second values comprises a number of references to the objects implemented at the processing cores.

12. The method of claim 10, wherein a first release of the object at the first processing core increments the first counter by a first value of one, and wherein a second release of the object at the first processing core increments the first counter by a second value of one.

13. The method of claim 10, wherein a first reference to the object at the second processing core increments the second counter by a first value of one, and wherein a second reference to the object at the second processing core increments the second counter by a second value of one.

14. The method of claim 10, further comprising:
prior to the comparing, totaling, by the multiple processing core system, respective values of the respective first counters; and
totaling, by the multiple processing core system, respective values of the respective second counters.

15. The method of claim 14, further comprising:
prohibiting, by the multiple processing core system, performance of the totaling of the respective values of the respective second counters until after completion of the totaling of the respective values of the respective first counters.

16. The method of claim 10, further comprising:
based on the result of the comparing indicating that the first values and the second values are different values, scheduling, by the multiple processing core system, another execution of the comparing after a defined interval.

17. A non-transitory machine-readable medium, comprising executable instructions that, when executed by a processor of a multiple processing core system, facilitate performance of operations, comprising:
receiving first values of first counters of first processing cores of the multiple processing core system and second values of second counters of second processing cores of the multiple processing core system, wherein the first values indicate a first total value of respective releases of a defined object at respective first processing cores of the processing cores, and wherein the second values indicate a second total value of respective acquisitions of the defined object at the respective second processing cores, wherein at least one first processing core of the first processing cores executed at least one operation on the object and released the object and at least one second processing core of the second processing cores referenced the object; and
based on a comparison of the first values and the second values indicating that the first values and the second values are a same value and based on a flag being set in a reclaiming field of a data structure, wherein the flag indicates the defined object is to be removed, facilitating a removal of the defined object from the multiple processing core system by a processing core selected from the processing cores based on the processing core being a last processing core to release the defined object.

18. The non-transitory machine-readable medium of claim 17, wherein the operations further comprise:
prior to the receiving the second values, determining the receiving the first values has finalized.

19. The non-transitory machine-readable medium of claim 17, wherein the removing the defined object comprises removing a long-lived reference associated with the defined object.

20. The multiple processing core system of claim 1, wherein reclaim field in the data structure is a Boolean variable, and wherein the Boolean variable is updated atomically.

* * * * *